United States Patent
Kahlbacher

(10) Patent No.: US 6,802,349 B2
(45) Date of Patent: Oct. 12, 2004

(54) ANTI-SKID DEVICE FOR MOTOR VEHICLES WITH PNEUMATIC TIRES

(76) Inventor: Anton Kahlbacher, Friedenstrasse50, A-3363 Amstetten-Neufurth (AT)

( * ) Notice: Subject to any disclaimer, the term of this patent is extended or adjusted under 35 U.S.C. 154(b) by 0 days.

(21) Appl. No.: 10/200,005

(22) Filed: Jul. 19, 2002

(65) Prior Publication Data

US 2003/0041940 A1 Mar. 6, 2003

(30) Foreign Application Priority Data

Sep. 6, 2001 (AT) .......................................... 1404/2001

(51) Int. Cl.[7] ............................................. B60B 15/00
(52) U.S. Cl. ................... 152/225 R; 152/208
(58) Field of Search ............................ 152/208, 213 R, 152/214, 216, 213 A, 217, 218, 221, 225 BR

(56) References Cited

U.S. PATENT DOCUMENTS

| | | | | |
|---|---|---|---|---|
| 2,527,939 A | * | 10/1950 | Krider | 152/213 R |
| 4,376,457 A | * | 3/1983 | Guenther | 152/213 R |
| 4,388,754 A | * | 6/1983 | Ilon | 29/446 |
| 4,411,301 A | * | 10/1983 | Bindel | 152/213 R |
| 4,416,319 A | * | 11/1983 | Hofmann | 152/213 R |
| 4,799,522 A | * | 1/1989 | Ilon | 152/213 R |
| 4,834,158 A | * | 5/1989 | Katz | 152/213 R |
| 4,836,258 A | * | 6/1989 | Ellis | 152/213 A |
| 4,884,933 A | | 12/1989 | Preusker et al. | |
| 5,223,058 A | | 6/1993 | Preusker | |
| 5,254,187 A | * | 10/1993 | Metraux | 152/216 |
| 5,282,503 A | | 2/1994 | Koshi et al. | |
| 5,303,757 A | | 4/1994 | Wakatsuki et al. | |
| 5,540,267 A | * | 7/1996 | Rona | 152/216 |
| 5,735,980 A | * | 4/1998 | Robeson | 152/216 |
| 5,785,783 A | * | 7/1998 | Thioliere | 152/216 |
| 5,961,754 A | * | 10/1999 | Benson | 152/171 |
| 6,053,227 A | * | 4/2000 | Robeson | 152/225 R |
| 6,341,635 B1 | * | 1/2002 | Robeson | 152/225 R |

FOREIGN PATENT DOCUMENTS

| | | |
|---|---|---|
| AT | 385243 | 3/1988 |
| DE | 2721662 | 3/1979 |
| DE | 2850810 | 7/1979 |
| DE | 0285903 A1 * | 3/1988 |
| DE | 3844494 | 7/1990 |
| DE | 3910669 | 10/1990 |
| EP | 0285903 | 10/1988 |
| EP | 0376427 | 7/1990 |
| GB | WO-84/04071 A1 * | 10/1984 |
| WO | 8404071 | 10/1984 |

* cited by examiner

Primary Examiner—Frantz F. Jules
(74) Attorney, Agent, or Firm—Friedrich Kueffner

(57) ABSTRACT

An anti-skid device for motor vehicle with pneumatic tires comprising at least two arms at an angle to each other next to the rim when in the installed state, a fastening device for attaching the arms to a wheel of a motor vehicle with an adapter part which can be attached to at least two lug bolts or lug nuts and with a coupler connected to the arms. The coupler can be connected to the adapter part and for this purpose has at least one locking part which can be inserted into at least one opening in the adapter part and fixed in place. The adapter part also has at least two mounting holes through which it can be attached by means of clamping heads to the lug bolts or lug nuts.

23 Claims, 6 Drawing Sheets

Fig. 4
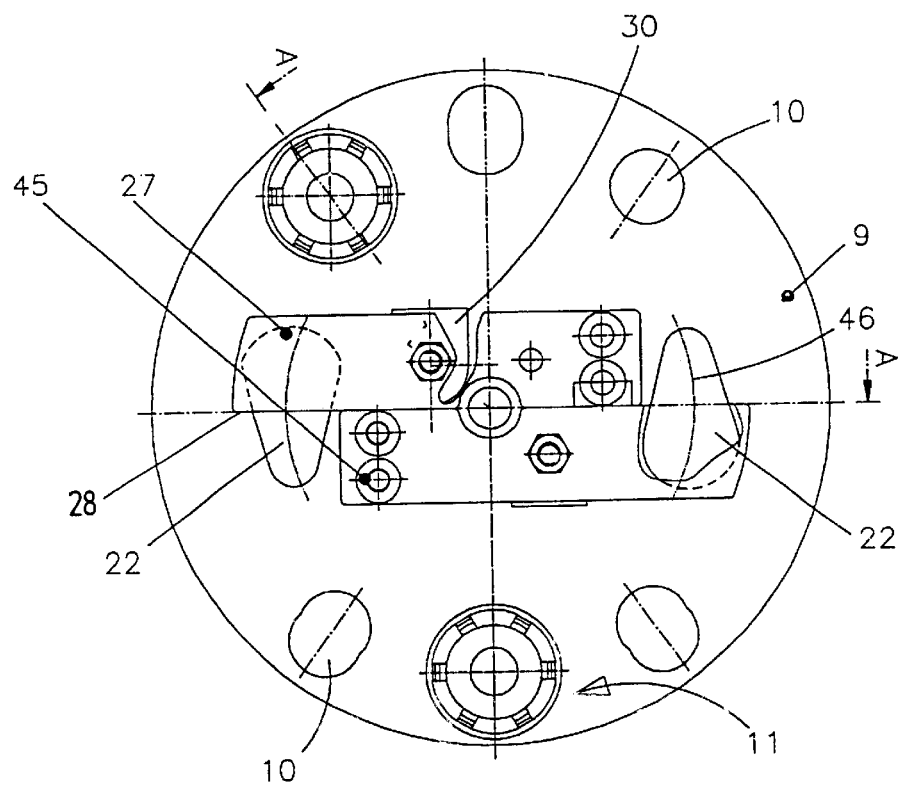
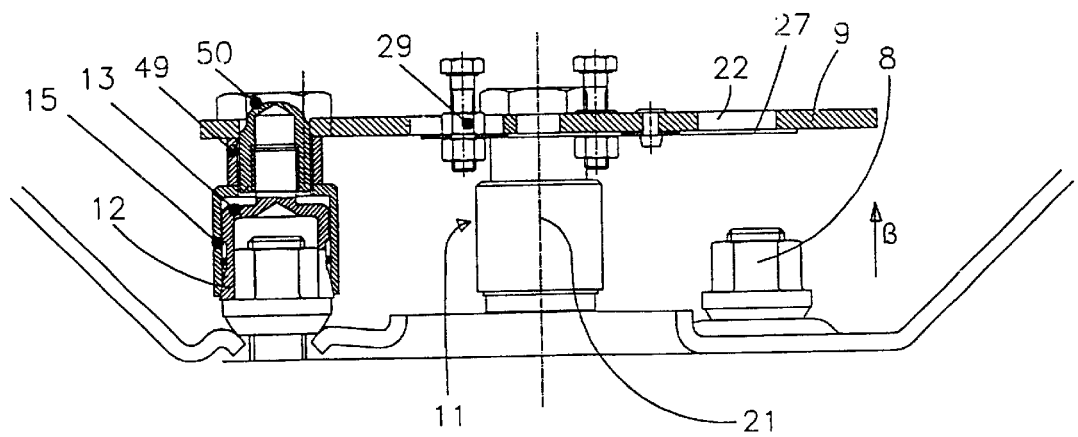
Fig. 3

ANTI-SKID DEVICE FOR MOTOR VEHICLES WITH PNEUMATIC TIRES

The invention pertains to an anti-skid device for motor vehicles with pneumatic tires, which device has at least two arms at an angle to other each next to the wheel rim when in the installed state, the free ends of the arms being connected to anti-skid means laid around the circumference of the tire, where a fastening device can be used to attach the arms to the wheel.

An anti-skid device of this type is known from Austrian Patent No. 385,243. This also has a bracket, which, when in the installed state, is located next to the outside surface of the wheel and comprises two arms at an angle to each other, the free ends of which are connected to anti-skid means in the form of chains laid around the circumference of the wheel. A coupling device attaches the bracket to the wheel, against which the bracket is held under tension. Rubber belts, which are hooked onto the rim of the wheel, are part of this coupling device. The disadvantages are that not every rim is suitable for accepting the hooks of rubber belts and that this form of attachment to the wheel is not very reliable.

An anti-skid device of the type indicated above, in which a clamping head, which can be attached to a lug nut, is provided to connect the coupling device to the wheel, is also known on the basis of public prior use. In this anti-skid device, the clamping head is connected to the arms of the bracket by a rubber strand, the free ends of which are supported in bushings. One of these bushings is attached to the arms of the bracket, while the other is connected to the clamping head by a connecting piece. The rubber strand exerts a tensioning force on the bracket directed toward the wheel and also absorbs the shifts between the bracket and the clamping head during the rotation of the wheel which are caused by imperfect centering of the installed bracket and especially by the flexing movement of the pneumatic tires as they roll. The disadvantage of this device is the connecting points between the rubber strand and the retaining bushings attached to it, which obviously represent a weak point. As a result of the forces which occur during the use of the anti-skid device, it is possible over the course of time for the rubber strand to work itself loose and break away. The clamping head also works itself loose as a result of the uncentered forces after a relatively short period of operation.

A similar anti-skid device, the bracket of which has a fastening element for connection to a lug bolt, is also known from DE 38 44 494 A1.

A clamping head for attaching an anti-skid device to a lug bolt is also known from, for example, DE 39 10 669 A1. Here the attachment to the lug bolt is off-center and out of balance, and as a result of the one-sided load the snow chain also works itself loose from its anchoring more easily.

An anti-skid device is also known from EP 0,285,903 A1. This device has an adapter part for fastening the anti-skid device to the wheel of the vehicle. The adapter part can be attached by means of clamping heads, which are fastened to the lug bolts.

A task of the invention is to provide an anti-skid device of the type described above which is easy to install and makes possible a reliable attachment of the anti-skid device to the circumference of the tire. This is achieved according to the invention by an anti-skid device.

In an anti-skid device according to the invention, a reliable attachment of the fastening device to the lug nuts or lug bolts is made possible by the adapter part. If the anti-skid device is not needed and is to be removed from the circumference of the tire, the adapter part can remain on the lug nuts. The adapter part can be of a simple design in this case, so that it can be produced at low cost. A single adapter part can be designed in such a way that it can be used on different types of rims such as four-hole rims and five-hole rims. It is also possible to provide different types of adapter parts for different types of rims, especially with respect to the mounting holes and/or with respect to the size of the adapter part, all of which can be used in conjunction with the same coupler.

In an advantageous exemplary embodiment, the anti-skid devices are designed as circumferentially closed, endless strands of chain and are connected by retaining tabs to the arms, a recess being provided in each retaining tab to guide the strand of chain over its assigned tab. To attach the strands of chain in the recesses in the retaining tabs, it is advisable to provide holes in the side walls of these recesses, in which holes chain fastening bolts can be introduced, which are essentially parallel to the surface of the tire, and each of which passes through a link of the chain.

It is also advantageous for the coupling device to comprise a central bolt, on which the arms of the bracket of the anti-skid device are supported. This bolt is connected by ball joint-like connections to the arms at one end and to the minimum of one locking part at the other. It is therefore possible for the movements which occur as a result of the flexing of the tire as it rolls to be absorbed, as a result of which a long service life can be achieved without the occurrence of material fatigue fractures.

Additional advantages and details of the invention are explained in the following on the basis of the exemplary embodiment illustrated in the drawing, from which additional tasks of the invention can be derived:

FIG. 3 shows a magnified view of the adapter part, which is attached to the lug nuts or lug bolts (cross-sectional line AA in FIG. 4);

FIG. 4 shows a partial cutaway view from below the adapter part with the clamping heads arranged in two mounting holes (in viewing direction B in FIG. 3);

Figure 1:
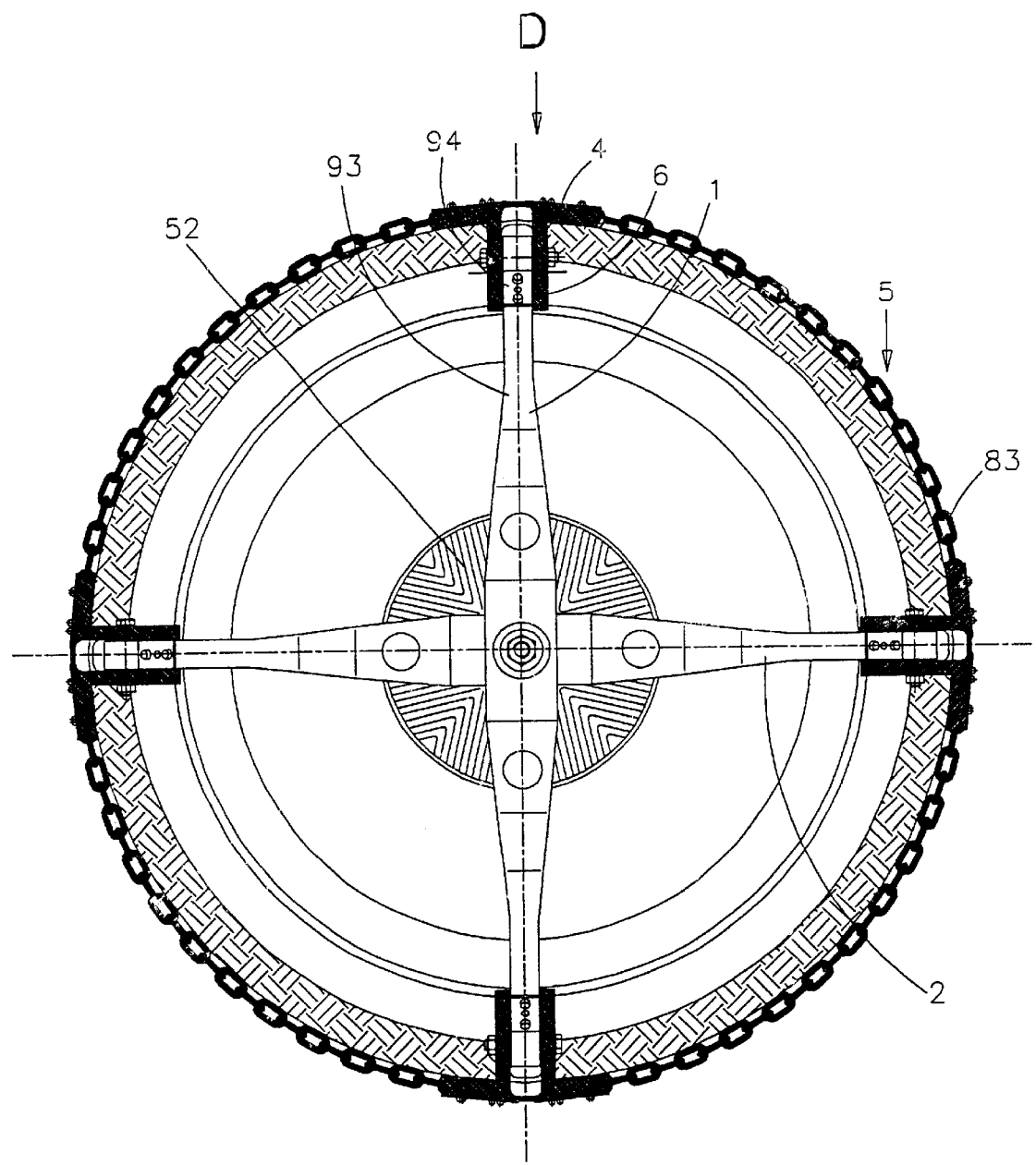
FIG. 1 shows a side view of a wheel with an anti-skid device attached to it.
Figure 2:
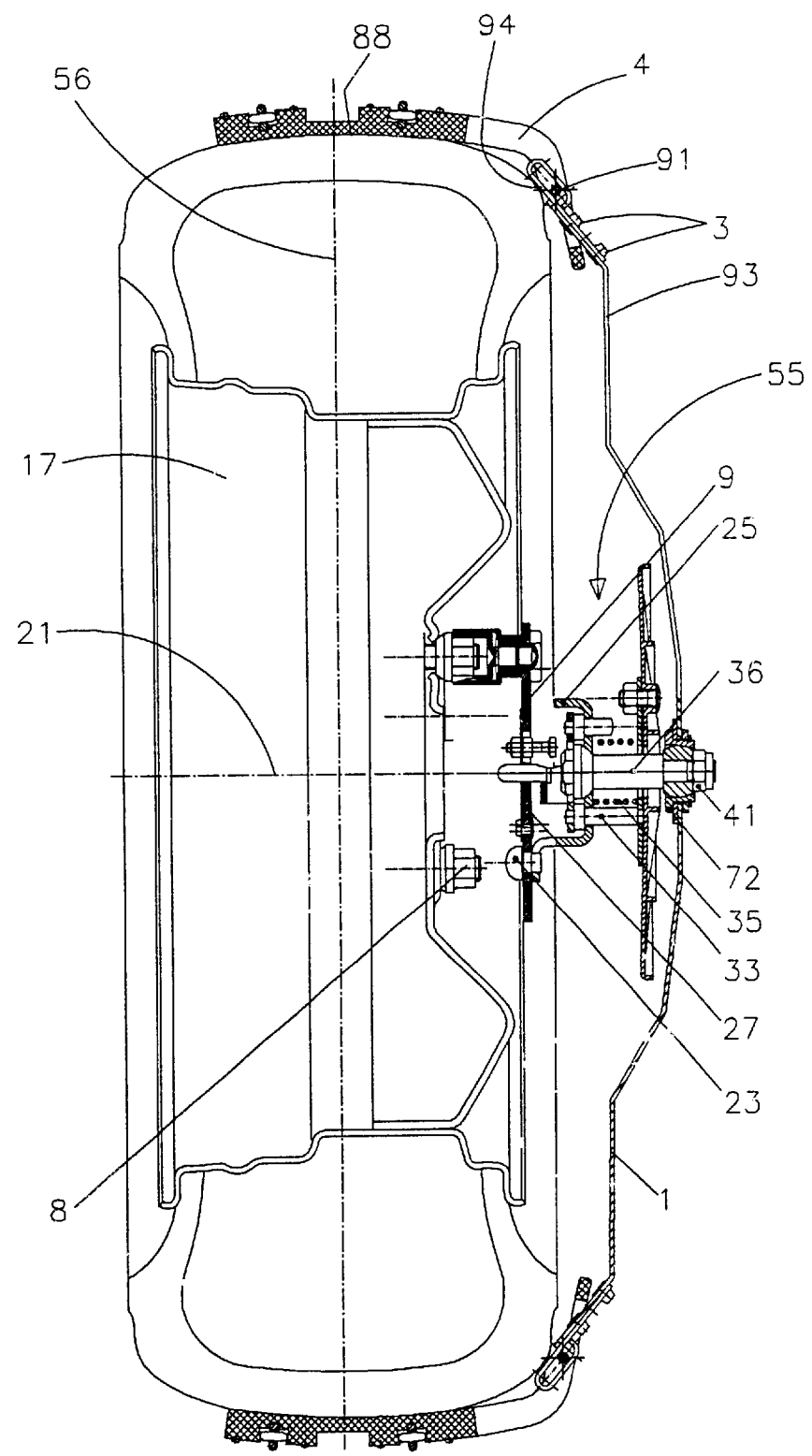
FIG. 2 shows a cross section perpendicular to the plane of the drawing of FIG. 1 (adapter part in cross section, corresponding to FIG. 3)
Figure 6:
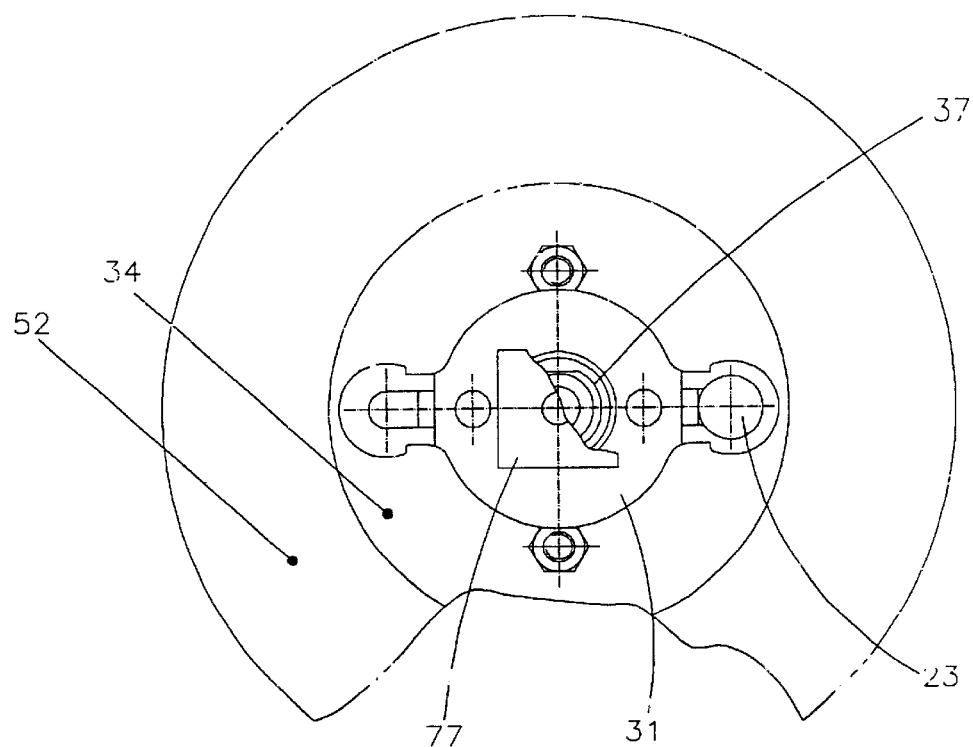
FIG. 6 shows a partial cutaway view from below the coupler (in viewing direction C in FIG. 5)

As can be seen in FIG. 1, an anti-skid device in the form of a so-called self-installing snow chain has two crossing arms 1, 2, which, in the installed state of the snow chain, are located next to the outside surface of the wheel. These arms are supported so that they can swivel with respect to each other around a central axis in order that the snow chain can be supported in a minimum of space. As a result of the elastic design of the arms 1, 2, the ends of the arms can exert a force against the tire when the snow chain is mounted. The arms 1, 2 can each be designed to consist of multiple parts, where parts 93, 94 are connected to each other by screws 3 or rivets. By making use of the appropriate holes in the overlapping sections of the two parts of the arms, it is therefore possible to adjust the length of the arms to fit wheels of different sizes.

The free ends of the arms 1, 2 are connected by retaining tabs 4, preferably made of plastic, to anti-skid means 5, designed here as endless chains. The retaining tabs 4 are designed in the form of plates, each of which is connected by an arm extension 6 to the free end of an arm 1, 2; the tabs are free to swivel with respect to the free ends of the arms around an axis which is parallel to the expected central plane 56. To hold the strands 83, each of the retaining tabs has a recess 84 for each strand, by which the strand is guided over the retaining tab 4. In the side walls 85 of these recesses 84, holes 86 are provided, through which the chain attachment bolts 87 pass in the direction parallel to the tread 88 of the tire; each of these bolts passes through a link of the chain. In the areas of the retaining tab 4 where the tab rests on the tread 88 of the tire, knob-like elevations 89 are provided on the outside surface facing away from the tread to improve the anti-skid behavior of the retaining tabs 4 on snow and ice. It is also advisable to provide knob-like elevations 92 on the bottom surfaces of the retaining tabs 4 to help prevent any slippage with respect to the tread 88. So that they can also be effective in the area of the retaining tabs, the links of the chain strand lying in the recesses 84 project beyond the top surface of the retaining tab.

The retaining tab is connected by a transverse bolt 91 to the free end of the arm, which is bent over to form an eye and projects into a slot 90 in the arm extension 6 of the retaining tab. The transverse bolts extends across the slot.

Figure 7:
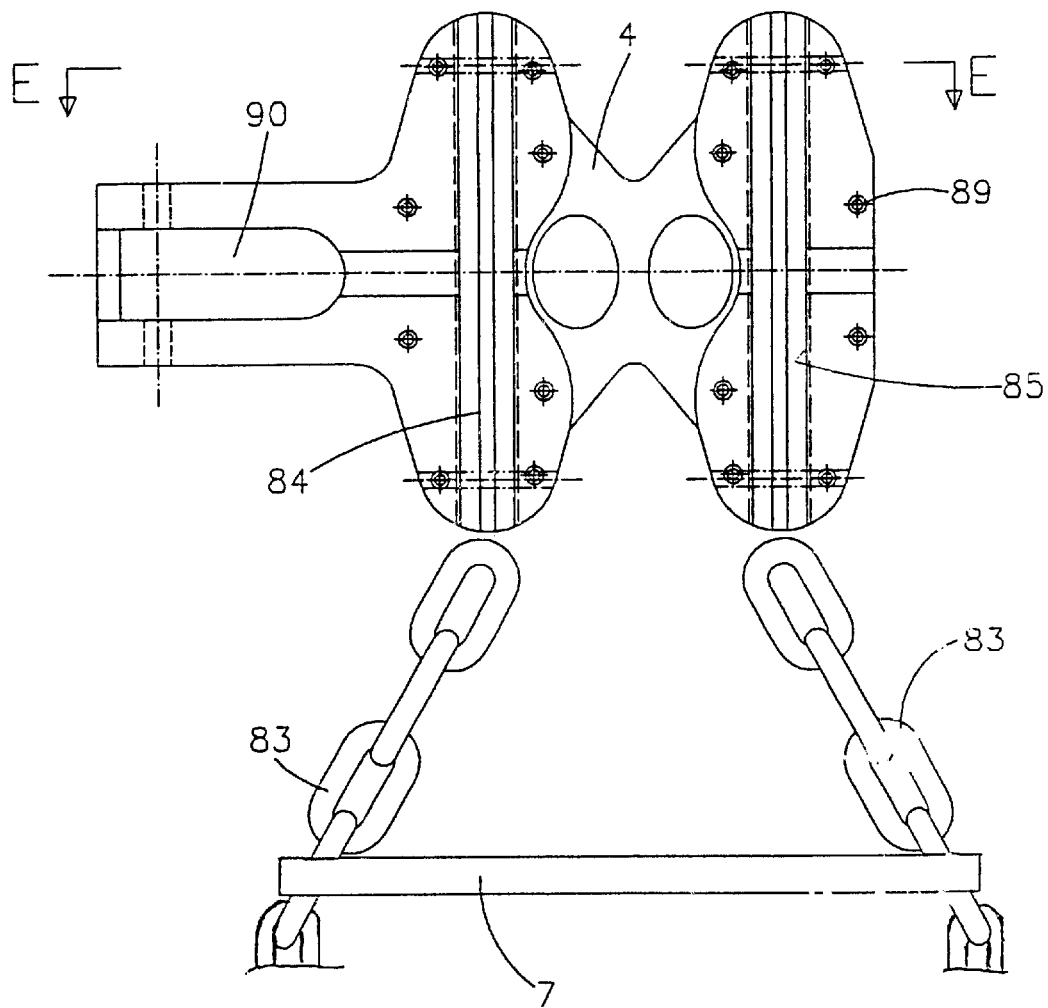
FIG. 7 shows a view of a retaining tab (in viewing direction D in FIG. 1), where the strands of the chain are illustrated only schematically for the sake of clarity and only in an area situated near the retaining tab.
Figure 8:
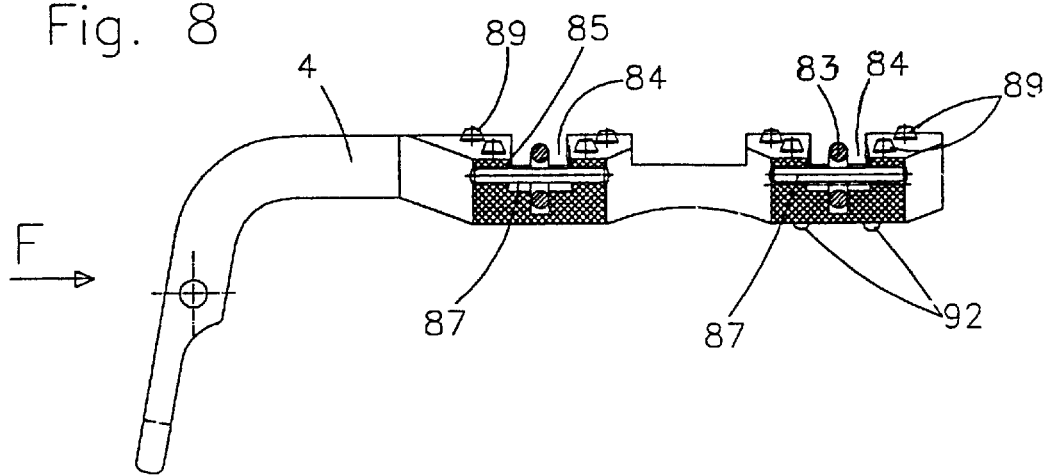
FIG. 8 shows a cross section along line EE of FIG. 7.
Figure 9:
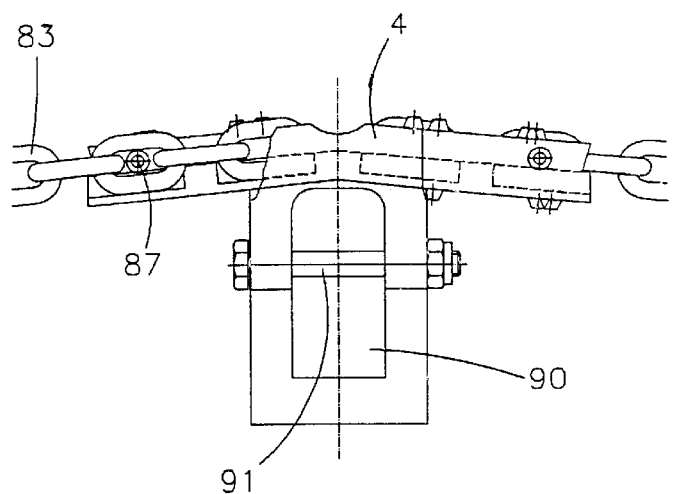
FIG. 9 shows a partial cutaway side view of a retaining tab (in viewing direction F in FIG. 8)

Spacers 7 are provided to keep the strands 83 of the chain apart in the areas between the retaining tabs 4. These spacers 7 hold the strands a certain distance apart, this distance being greater than that between the recesses 84 in the retaining tabs. In the areas adjacent to the retaining tabs, the chain strands therefore extend out toward the sides at an angle, as illustrated in an exaggerated manner in FIG. 7, which has the effect of stabilizing the strands and preventing them from shifting laterally.

Although the design of the retaining tabs shown here represents a preferred embodiment, other designs are also conceivable and possible. They can also be designed in correspondence with the state of the art cited in the introduction to the specification. In place of endless chains, it would also be possible to use individual sections of chain, the ends of which are attached to the tabs, so that each section extends between one retaining tab and the next.

The arms 1, 2 can be attached by a fastening device to the lug bolts or lug nuts 8, as will be explained in greater detail below. The fastening device comprises an essentially flat, disk-shaped adapter part 9, which can be attached to at least two lug bolts or lug nuts, and the base body of which is made as a single piece. Clamping heads 11 are provided to attach the adapter part 9; these clamping heads pass through mounting holes 10 in the adapter part, which has a circular circumferential contour. The mounted adapter part spans the center of the rim, where the central longitudinal axis 21 of the rim passes through the center point of the adapter part 9.

Figure 10:
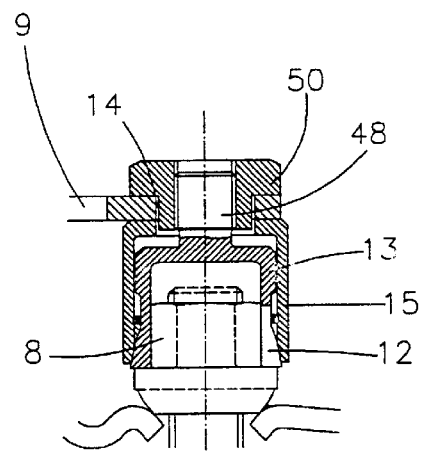
FIGS. 10 and 11 show longitudinal cross sections through the clamping heads.
Figure 11:
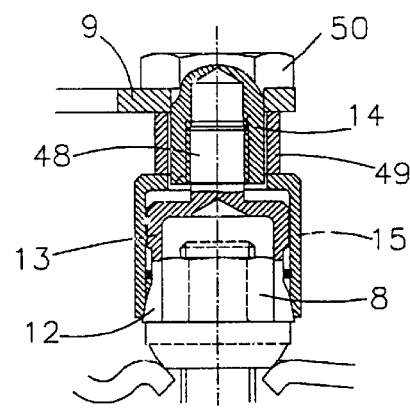
Figure 12:
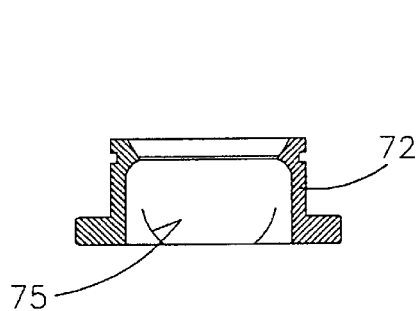
FIG. 12 shows a longitudinal cross section of the bearing part with the ball joint socket.
Figure 13:
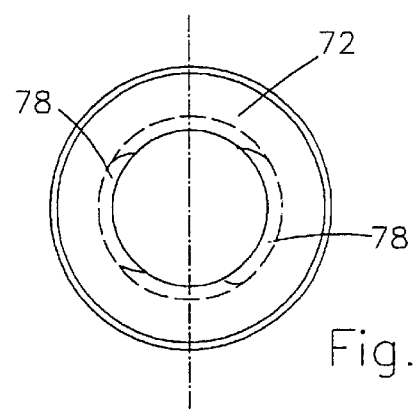
FIG. 13 shows a view of the bearing part of FIG. 12 from below.

A possible design of a clamping head is illustrated in FIGS. 10 and 11. A clamping head 11 of this type comprises a clamping bushing 13, on the front end of which finger-like clamping extensions 12 with a conical or wedge-shaped, outward-projecting exterior surface are arranged. The clamping projections 12 have grooves machined into their inside walls to prevent the clamping head from slipping off the head of the lug bolt or the lug nut 8. A clamping sleeve 15 surrounding the clamping bushing 13 rests on the clamping extensions. A threaded extension 48 with an outside thread is attached to the rear of the clamping bushing. A tensioning sleeve 14 with an inside thread can be screwed onto the threaded extension. This tensioning sleeve has a screw head 50. By screwing in the tensioning sleeve 14, the clamping sleeve 15 is moved forward and pushed against the conical outside surface of the clamping extensions 12, so that these are pushed inward. The adapter part 9 is inserted directly between the rear surface of the clamping sleeve 15 and the screw head 50 of the tensioning sleeve 14 (FIG. 10), or a spacer sleeve 49 is inserted additionally between the adapter part 9 and the rear surface of the clamping sleeve 15, which for this purpose is provided with an inward-extending flange 51 (FIG. 11). By means of a clamping head of this type, a modular system for different rims and lug nuts can easily be made available.

So that the adapter part 9 can be attached to the lug nuts 8 by means of the clamping heads 11, mounting holes 10 spaced a certain distance apart from each other in the circumferential direction are provided in the adapter part 9. In the exemplary embodiment shown, six of these mounting holes 10 are provided, some of which are designed as slots. An adapter part of this type can be used for various four-hole and five-hole rims. It is also conceivable in principle and possible to provide adapter parts individually adapted to each type of rim. An adapter part which can be used for different rims, however, is preferred, which adapter will have at least five, preferably at least six mounting holes 10 distributed around the circumference.

In the adapter part 9 there are also two pear-shaped openings 22, symmetric to the central, longitudinal axis 21 of the wheel rim 17. These openings 22, the axes of which are parallel to the longitudinal axis 21 of the rim, are on the same plane as the mounting holes 10, the axes of which are also parallel to the longitudinal axis 21 of the rim. In these openings 22, mushroom-shaped locking parts 23 can be held, which are attached to a coupler 55 of the fastening device. The coupler 55 comprises here an intermediate piece 25, which has a plate-shaped section 32, which is parallel to the adapter part when the coupler is connected to the adapter part, and two arms 26, proceeding laterally from the plate section, which arms are perpendicular to the plate-shaped section 32 and extend down toward the wheel rim 17. The free ends of these arms 26 are bent in an offset manner toward the outside, and the locking parts 23 are provided on the sections bent in this way.

To connect the locking parts 23 to the adapter part 9, the heads 24 of the locking parts 23 can be inserted into a first area of the opening; the width of this first area of the opening is larger than the diameter of the head 24 of the locking part. By rotating the intermediate piece 25 (in the counterclockwise direction in FIG. 3), the mushroom-shaped locking parts are pushed into the second areas of the openings 22, the width of which is smaller than the diameters of the head 24 of the locking parts 23, so that the heads 24 engage behind the edges of the openings 22 in these second areas of the openings 22. The neck 20 of each locking part 23 thus rests snugly against the edge of the opening 22. The longitudinal centerline of each opening 22, along which the two sections of the opening 22 lie, forms an arc of a circle.

To secure the locking parts in the locked position (i.e., when they are in the second area of the openings (22)), leaf springs 27 are attached to the rear surface of the adapter part 9 facing the rim 17. When in the relaxed state, these springs rest against the adapter part 9 and cover the first areas of the openings 22; one of the long edges of the each spring extends between the first area and the second area of the opening 22. When the head 24 of the locking part 23 is inserted into the first area of the opening 22, the associated leaf spring 27 is therefore pushed down toward the rim 17. After the locking part 23 has been pushed into the second area of the opening 22 by the rotation of the intermediate piece 25, the leaf spring springs back into its position resting against the adapter part 9 and thus prevents the locking part, which is now in the second area of the opening 22, from shifting back unintentionally into the first area of the opening 22 (e.g., when the vehicle is being driven in reverse). The leaf springs 27 are attached to the adapter part 9 by blind rivets 45.

So that it is possible to shift the locking parts 23 back again into the first areas of the openings 22, pins 29 in the form of screws are attached to the leaf springs 27; the screws project through holes in the leaf spring 27, and the leaf spring lies between two nuts screwed onto the screw. In the area of these pins 29, openings 30 are provided in the adapter part 9, through which the pins 29 can pass through the adapter part 9. These pins 29 can be used to move the leaf springs 27 away from the adapter part 9 toward the rim 17, whereupon the associated locking part 23 can be shifted back into the first area of the opening 22, pulled out through this first area of the opening, and thus removed from the adapter part 9.

To actuate the pins 29, a pressure plate 31 is provided, which can be moved down along the arms 26 of the intermediate piece 25. So that the pressure plate 31 can be shifted, it is attached to the forward ends of connecting pins 33, which pass through openings in the plate-shaped section 32 of the intermediate piece 25. The opposite ends of these pins are attached to a carrier disk 34. The plate-shaped section 32 of the intermediate piece 25 and the carrier disk 34 are kept a certain distance apart by a compression spring 35. An actuating disk 52 is firmly screwed to the carrier disk 34. By pressing the actuating disk 52 down toward the rim 17, the pressure plate 31 is pushed against the pins 29, which causes the leaf springs 27 to move away from the adapter part 9. This releases the locking parts held in the second sections of the openings 22. To open the fastening device, the pressed-down actuating disk 34 is rotated, which has the effect of rotating the intermediate piece 25 as well. The locking parts 23 are thus pushed from the second areas of the openings to the first areas of the openings 22 and can then be pulled out through these openings.

Figure 5:
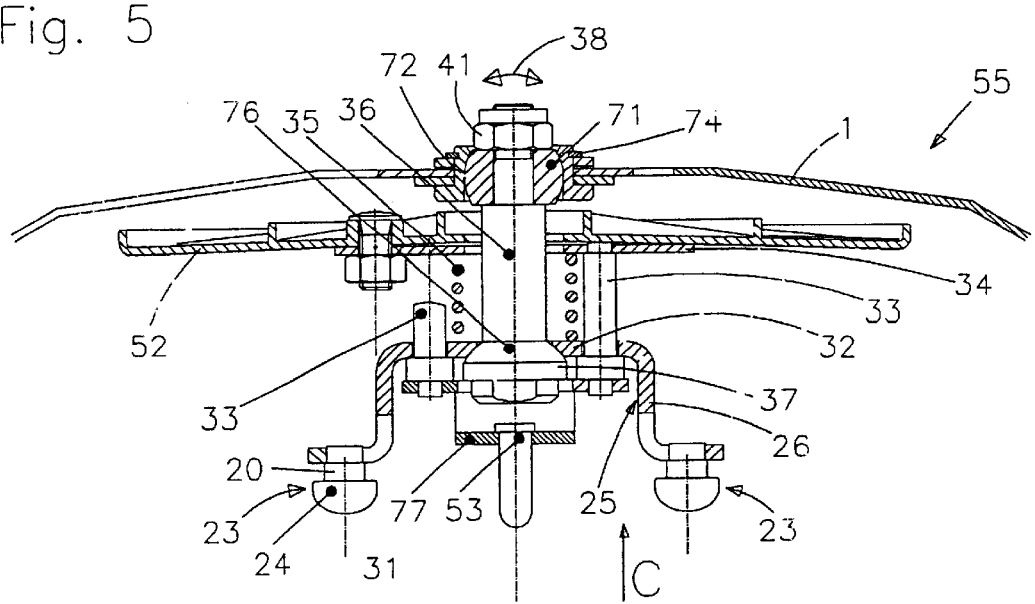
FIG. 5 shows a magnified view of the coupler in a cross section corresponding to FIG. 2.

A central bolt 36 of the coupler 55 is connected at one end by a ball joint-like connection to the arms 1, 2 and at the other end by another ball joint-like connection via the intermediate piece 25 to the two locking parts 23. The central bolt 36 is thus able to swivel in all directions (as indicated by the arrow 38 in FIG. 5). To form the ball joint-like connection between the arms 1, 2, the bracket 3, and the central bolt 36, a ball joint head 71 is seated on the central bolt. For this purpose the bolt 36 has a section of reduced diameter, and the free end is provided with a thread. The ball joint head 71 is pushed onto this section until it rests against the shoulder of the section of the bolt with the larger diameter. The nut 41 is screwed onto the thread at the free end of the section with the reduced diameter. A bearing part 72, which has a ball joint socket 75, is supported on the ball joint head 71. This bearing part 72 carries the arms 1, 2, which are rotatably held between an outward-extending, ring-shaped flange of the bearing part 72 and a disk 73, which is pushed onto the bearing part 72, which disk is locked in place by a Seeger circlip ring 74. The bearing part 72 is free to swivel in all directions along with the arms 1, 2 on the ball joint head 71. So that the ball head can be introduced into the ball joint socket 75, the bearing part 72 has two lateral openings 78 in the spherical surface at the bottom. The ball head is introduced through these openings, while its longitudinal axis is tipped 90° relative to the longitudinal axis of the bearing part 72. Then it is tipped back by 90°, so that its longitudinal axis is parallel to the longitudinal axis of the central bolt 36. It is then seated in this position on the bolt 36 and fastened there by the nut 41.

At the end opposite the arms 1, 2, the central bolt 36 is connected by an additional ball joint-like connection to the intermediate piece 25. For this purpose, the head 37 of the bolt has a spherical shell-like surface 76 on the side facing the arms 1, 2, on which surface the edge of a central opening in the plate-shaped section 32 of the intermediate piece 25 rests. The edge of this opening is adapted to conform to the spherical contour of the surface 76 so that the bolt 36 can swivel with respect to the intermediate piece 25 without a great deal of friction.

A strap 77 is rigidly attached to the pressure plate 31 to carry a centering pin 53. When the fastening device is closed, this pin projects through the central centering opening 54 into the adapter part 9. This centering pin makes it easier to close the fastening device, and it also centers the fastening device, so that eccentricities caused by the centrifugal forces during operation are prevented from building up.

To ensure a snug fit between the leaf springs 27 and the adapter part 9, these areas can be magnetized. This guarantees that the two locking parts 23 will not work themselves loose.

Various modifications of the exemplary embodiment shown are conceivable and possible without leaving the scope of the invention. For example, a different number and/or shape of the openings 22 in the adapter part could be provided. The locking parts 23 could also have a different shape; for example, they could be provided with a spherical head.

As can be seen from the preceding description, the area of the invention is not limited to the exemplary embodiments; on the contrary, it is to be defined on the basis of the attached claims together with the full range of possible equivalents.

Legend to the Reference Numbers 1 arm
2 arm
3 screw
4 retaining tab
5 anti-skid means
6 arm extension
7 spacer
8 lug nut
9 adapter part
10 mounting hole
11 clamping head
12 clamping extension
13 clamping bushing
14 tensioning sleeve
15 clamping sleeve
16 surface
20 neck
17 wheel rim 21 longitudinal axis
22 opening
23 locking part
24 head
25 intermediate piece
26 arm
27 leaf spring
28 edge
29 pin
30 opening
31 pressure plate
32 section
33 connecting pin
34 carrier disk
35 compression spring
36 bolt
37 head
38 arrow
41 nut
45 blind rivet
46 longitudinal centerline
48 threaded extension
49 spacer sleeve
50 screw head
51 flange
52 actuating disk
53 centering pin
54 centering hole
55 coupler
56 center plane of the rim
71 ball joint head
72 bearing part
73 disk
74 Seeger circlip ring
75 ball socket
76 surface
77 strap
78 recess
83 chain strand
84 recess
85 side wall
86 hole
87 chain attachment bolt
88 contact surface
89 elevation
90 opening
91 transverse bolt
92 elevation
93 part
94 part

What is claimed is:

1. Anti-skid device for motor vehicles with pneumatic tires comprising:

at least two arms (1, 2) at an angle to each other next to the wheel rim when in the installed state, the free ends of which are connected to anti-skid means (5) to be laid around the circumference of the tire; and a fastening device (9, 55) for attaching the arms (1, 2) to a wheel of the motor vehicle with an adapter part (9), which is attachable to at least two lug bolts or lug nuts (8), and with a coupler (55), connected to the arms (1, 2), where the coupler (55) is coupleable to the adapter part (9) and has for this purpose at least the locking part (23), which is insertable into at least one opening (22) in the adapter part and fixed in place there;

and where the adapter part (9) also has at least two mounting holes (10), by means of which the adapter art (9) is attached by clamping heads (11) to the lug bolts or lug nuts (8).

2. Anti-skid device according to claim 1, where the adapter part (9) spans the center point of the rim.

3. Anti-skid device according to claim 2, where the adapter part (9) has a circular circumferential contour, and in that a central longitudinal axis (21) of the rim passes through the center point of the adapter part (9).

4. Anti-skid device according to claim 2, where the adapter part (9) is designed essentially as a flat disk, and where the minimum of one opening (22) in the adapter part for the insertion of the minimum of one locking part (23) and the mounting holes (10) for the attachment to the lug bolts or lug nuts (8) are essentially on the same plane.

5. Anti-skid device according to claim 1, where at least five mounting holes (10) are provided on the adapter part (9), spaced a certain distance apart in the circumferential direction.

6. Anti-skid device according to claim 1, where the locking part (23) has an enlarged, preferably mushroom-shaped or spherical head, and where the opening (22) has a first area, into which the head (24) of the locking part (23) can be inserted, the diameter of the head being smaller than the width of this first area of the opening (22), and a second area, into which the locking part (23) already introduced into the opening (22) can be pushed, the diameter of the head (24) of the locking part (23) being larger than the width of the second area of the opening (22), so that the head (24) of the locking art (22) engages behind the edge of the opening (22) when in this second area of the opening (22).

7. Anti-skid device according to claim 6, where at least one leaf spring (27) is attached to the bottom surface of the adapter part (9), which spring rests on the adapter part (9) when not under load and covers the first area of the opening (22), where one of the long edges (28) of the leaf spring (27) runs between the first area and the second area of the opening (22) and prevents the locking part (23) present in the second area of the opening (22) from moving back unintentionally into the first area of the opening (22).

8. Anti-skid device according to claim 7, where, to open the fastening device, a pin (29) is attache to the leaf spring (27), which pin passes through an opening (3) in the adapter part (9), and by means of which the leaf spring (27) can be moved away from the adapter part (9), whereupon he locking part (23) can be shifted into the first area of the opening (22) and pulled out of the adapter part (9).

9. Anti-skid device according to claim 1, where at least two openings (22) for the introduction of locking parts (23) of the coupler (55) are provided in the adapter part (9), these openings being symmetric to the central longitudinal axis (21) of the rim (17).

10. Anti-skid device according to claim 1, where at least one of the mounting holes (10) is designed as a slot.

11. Anti-skid device according to claim 1, where the coupling device comprises a central bolt (36), on which the arms (1, 2) of the bracket (3) of the anti-skid device are supported.

12. Anti-skid device according to claim 11, where the central bolt (36) is connected by ball joint-like connections to the arms (1, 2) at one end and to the minimum of one locking part (23) at the other.

13. Anti-skid device according to claim 12, where, to form the ball joint-like connection between the arms (1, 2) of the bracket and the central bolt (36), a ball joint head (71) is provided at or on the central bolt, on which head a bearing part (72) with a ball joint socket (75) is supported, which bearing part carries the arms (1, 2).

14. Anti-skid device according to claim 12, where the central bolt (36) is connected at the end opposite the arms (1, 2) by a ball joint-like connection to an intermediate piece (25), to which the minimum of one locking part (23) is attached, where preferably the central bolt (36) has a head (37) on the end facing away from the arms (1, 2), on the rear surface of which a spherical shell-shaped surface (76) is provided, and where the edge of the central opening in the intermediate piece (25) rests against the spherical shell-shaped surface (76).

15. Anti-skid device according to claim 14, where the intermediate piece has a disk-shaped section (32), in which the central opening is provided, through which the central bolt (36) passes.

16. Anti-skid device according to claim 15, where a pressure plate (31) is supported with freedom to move between parallel arms (26) of the intermediate piece (25), which arms extend toward the rim, the pressure plate being attached to the ends of connecting pins (33), which pass through openings in the disk-shaped section (32) of the intermediate piece, and where, at the opposite ends of the connecting pins, a carrier disk (34) is attached, which is connected nonrotatably to the intermediate piece (25) or to the locking parts (23) attached to the intermediate piece (25).

17. Anti-skid device according to claim 16, where a compression spring is installed between the disk-shaped section (32) of the intermediate piece and the actuating disk (34).

18. Anti-skid device according to claim 16, where the pressure plate (31) is rigidly connected to a centering pin (53) extending toward the rim, which pin projects through a central centering hole in the adapter part (9) when the coupling device is closed.

19. Anti-skid device according to claim 1, where at least one circumferentially closed, endless chain strand (83) is provided, which extends around the tread (88) of the tire, where the chain strand (83) is guided across the retaining tab (4) by a recess (84) in the retaining tab (4) and is attached to the retaining tab (4), where holes (86) are provide in the side walls (85) of the recesses (84), which holes accept chain fastening bolts (87), which are essentially parallel to the tread (88), and each of which passes through a link of the chain.

20. Anti-skid device according to claim 1, where, in the areas where the retaining tab (4) rests on the tread (88) of the tire, knob-like elevations (89) are provided on the outside surface.

21. Anti-skid device according to claim 1, where a clamping head (11) has a clamping bushing (13), on the front end of which clamping extensions (12) with a conical or wedge-shaped, outward-projecting outside surface are provided, on which a clamping sleeve (15), which surrounds the clamping bushing (13) and the clamping extensions (12), is seated, where a threaded extension (48) is attached to the rear surface of the clamping bushing (13), which threaded extension preferably has an external thread, where a tensioning sleeve (14) can be screwed onto the threaded extension (48), which tensioning sleeve preferably has an internal thread, and by means of which the clamping sleeve (15) can be shifted forward and against the conical outside surfaces of the clamping extensions.

22. Anti-skid device according to claim 21, where a spacer sleeve (49), which surrounds the tensioning sleeve (14), can be inserted between the screw head (50) of the tensioning sleeve (14) and the rear surface of the clamping bushing (13), which is preferably provided on its rear surface with an inward-projecting, ring-shaped flange (51).

23. Anti-skid device according to claim 1, where the arms (1, 2) are designed to consist of multiple parts with a central part (93) and an end part (94), where the parts have an overlapping section provided with holes, through some of which screws (3) or rivets pass, where the length of the rims (1, 2) can be adjusted by changing the overlapping areas of the parts (93, 94) of the arms.

\* \* \* \* \*